Oct. 18, 1949.　　　　　K. A. KAIL　　　　2,485,291
SIMULATED FLIGHT CONTROL LOADING AND CENTERING
MEANS FOR GROUNDED AVIATION TRAINERS
Filed June 27, 1945　　　　　　　　　5 Sheets-Sheet 1

KARL A. KAIL
*INVENTOR.*

BY
ATTORNEYS

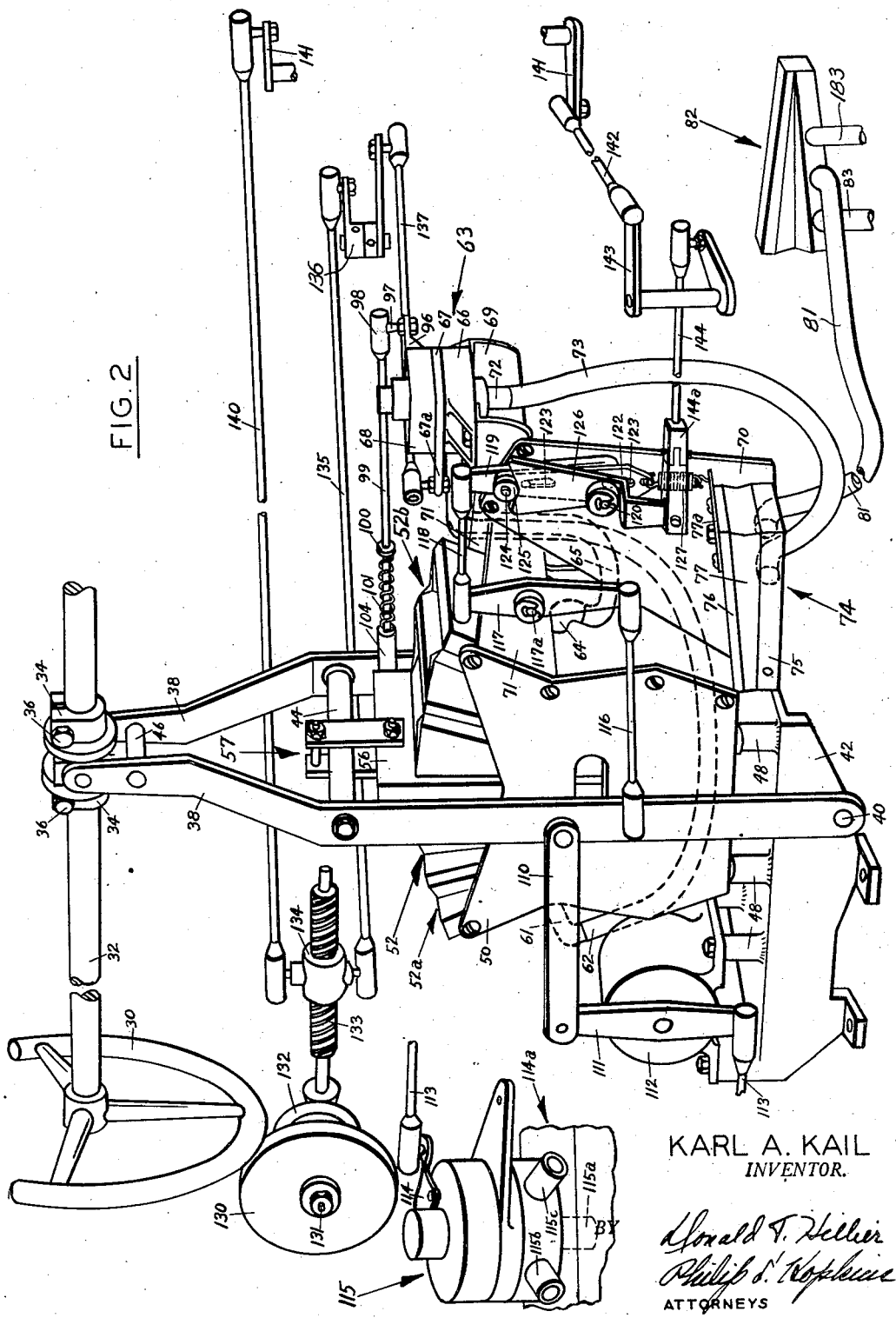

Oct. 18, 1949.       K. A. KAIL       2,485,291
SIMULATED FLIGHT CONTROL LOADING AND CENTERING
MEANS FOR GROUNDED AVIATION TRAINERS
Filed June 27, 1945                         5 Sheets-Sheet 3
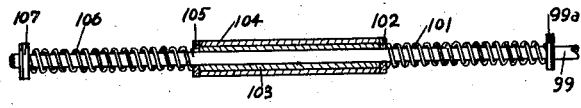
FIG. 2D
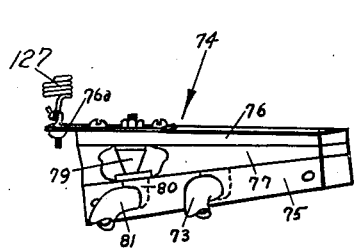
FIG. 2C
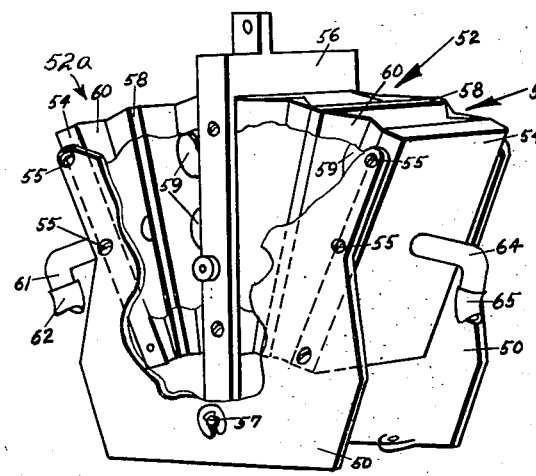
FIG. 2A
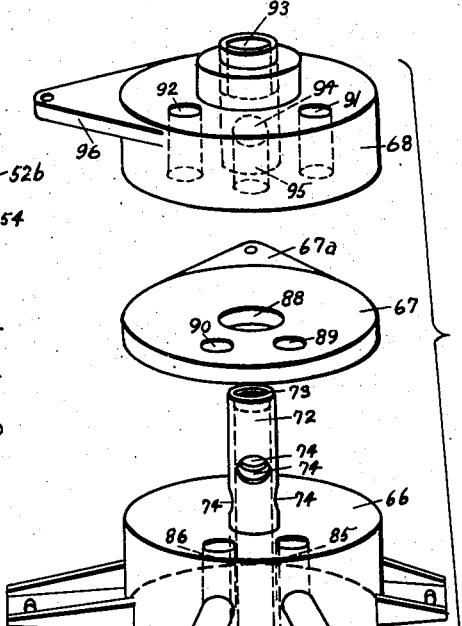
FIG. 2B
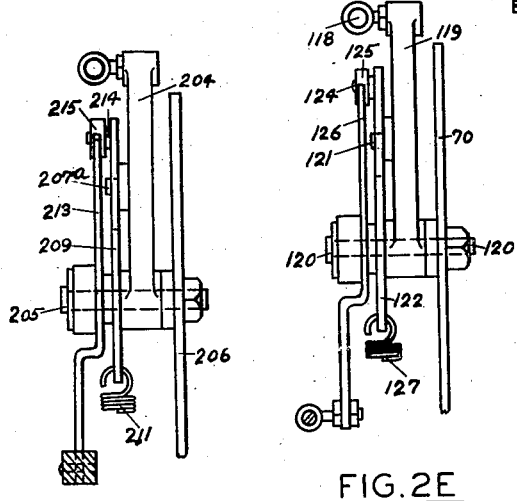
FIG. 3A
FIG. 2E
KARL A. KAIL
INVENTOR.
BY
ATTORNEYS

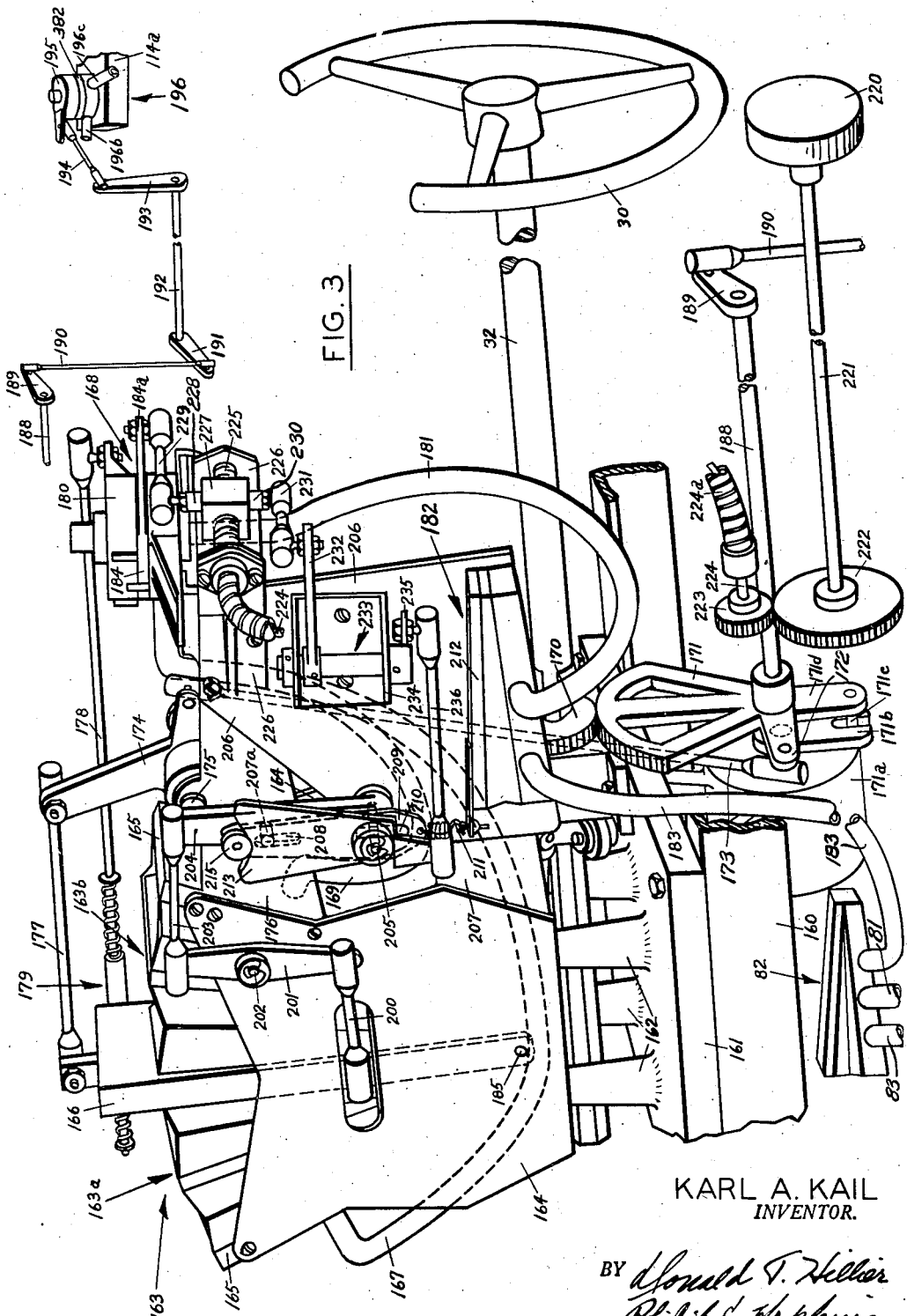
Oct. 18, 1949. K. A. KAIL 2,485,291
SIMULATED FLIGHT CONTROL LOADING AND CENTERING
MEANS FOR GROUNDED AVIATION TRAINERS
Filed June 27, 1945 5 Sheets-Sheet 4
KARL A. KAIL
INVENTOR.
BY
ATTORNEYS Oct. 18, 1949.　　　　K. A. KAIL　　　2,485,291
SIMULATED FLIGHT CONTROL LOADING AND CENTERING
MEANS FOR GROUNDED AVIATION TRAINERS
Filed June 27, 1945　　　　　　　　　　5 Sheets-Sheet 5

KARL A. KAIL
*INVENTOR.*

BY
ATTORNEYS

Patented Oct. 18, 1949

2,485,291

UNITED STATES PATENT OFFICE 2,485,291

SIMULATED FLIGHT CONTROL LOADING AND CENTERING MEANS FOR GROUNDED AVIATION TRAINERS

Karl A. Kail, Montrose, Pa., assignor to Link Aviation Inc., a corporation of New York Application June 27, 1945, Serial No. 601,776

21 Claims. (Cl. 35—12)

This invention relates to the provision of means for simulating in a grounded aviation trainer the operation and responses of certain of the flight controls in actual aircraft.

The preferred embodiment of my invention will be illustrated in conjunction with a grounded aviation trainer of the type manufactured by Link Aviation Devices, Inc., of Binghamton, New York. For the general construction and operation of such trainers reference is made to U. S. Patents 1,825,462 and 2,099,857.

In the case of actual aircraft in flight the slipstream places a load on the control surfaces (ailerons, elevator and rudder) which resists the movement of the control surfaces from their neutral position. Inasmuch as the control surfaces are connected to the flight controls (wheel or stick and rudder pedals) within the cockpit which the pilot manipulates to move the control surfaces in order to change the attitude of the plane about its three axes, when the control surfaces are in their neutral positions, the controls are similarly positioned. Thus when the pilot moves any one of the controls from its neutral position, the slipstream effect upon the control surfaces produces a force which resists the movement of the control from its neutral position. This force is commonly referred to in the art as "control loading."

It is a main object of this invention to provide novel means whereby a load may be placed upon the simulated controls in a grounded aviation trainer when the controls are moved from their respective neutral positions.

Further, in the case of planes in actual flight, if any one of the controls is moved from its neutral position the associated control surface is at the same time displaced from its neutral position. Then, if the control is released, the force of the slipstream upon the control surface connected to the control returns the control surface to its neutral position, and the control is simultaneously returned to the neutral position with the movement of the control surface.

It is a further object of my invention to provide novel means in a grounded navigation training device for returning the simulated controls to their respective neutral positions when they are moved from their neutral positions and released.

As disclosed in the two above mentioned U. S. patents and as is well known to the prior art, in trainers of the type in connection with which my invention will be illustrated there are provided three main control valves referred to as the rudder valve, elevator valve and aileron valve. The rudder valve is connected to the simulated rudder pedals in the simulated fuselage so that when the rudder pedals are moved from their neutral positions the fuselage properly turns to the left or right, according to the position of the rudder valve. Also, when the simulated control column or stick is moved ahead or to the rear of its neutral position, a connection between the stick and elevator valve operates the elevator valve so that the fuselage will assume the proper diving or climbing (pitching) attitude. Further, when the simulated control wheel or stick is moved in simulation of the manner in which the stick or control wheel in a real plane is moved to bank the plane, a connection from the control wheel or stick to the aileron valve moves the valve so that the simulated fuselage assumes a proper banking position.

It is a further object of my invention to combine in a trainer of the type illustrated structure arranged to accomplish the above stated objects of my invention combined with the rudder, elevator and aileron valves of such trainers, so that the controls are not only properly "loaded" when they are moved from a predetermined neutral position, and returned to the neutral position when the manual pressure thereupon is released, but also so that the fuselage is properly turned, pitched and banked according to the movements of the simulated flight controls.

In order that the preferred embodiment of my invention may be clearly understood, reference is made to the accompanying drawings wherein like characters designate like parts. In the drawings, Fig. 1 is a general view of a grounded aviation trainer of the type being considered showing the general location of many of the major parts of this invention.

Fig. 2 is a detailed perspective view of the elevator control loading system, together with the elevator trim system.

Fig. 2A is a detail view showing the construction of the elevator and aileron control loading bellows.

Fig. 2B is a detailed exploded view of a typical control loading centering valve which may form a part of my invention.

Fig. 2C is a detailed showing of a typical control loading regulator bellows.

Fig. 2D is a detailed showing of a compensating spring arrangement which may be used in the practice of my invention.

Fig. 2E is a detail view of the cam arrangement shown generally in Fig. 2.

Fig. 3 is a detailed showing of the aileron control loading and trimming means.

Fig. 3A is a detailed view of the cam arrangement shown generally in Fig. 3.

Figure 1:
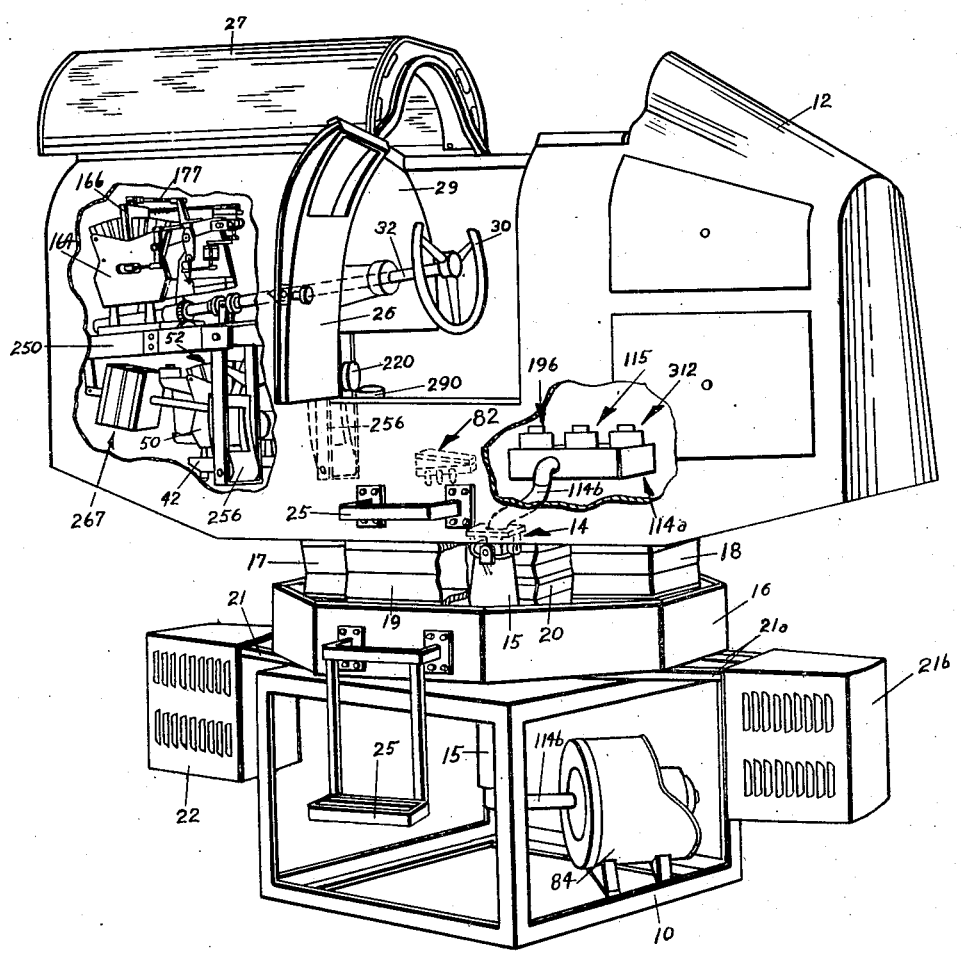

Reference is now made to Fig. 1 which is a general disclosure of grounded aviation trainers of the type covered by U. S. Patents 1,825,462 and 2,099,857. Such trainers comprise a stationary base 10 above which is mounted a fuselage 12 simulating the fuselage of an actual aircraft. Within this fuselage there is a seat for a student positioned to the rear of the control wheel 30. The fuselage 12 rests upon a universal joint 14 and this joint is supported by the main central vertical spindle 15 which is rotatably held by the stationary base 10. The conventional octagon is designated by 16 and as is well known to the prior art, octagon 16 is affixed to the main spindle 15 below the universal joint 14 by means of suitable horizontal arms so that the octagon 16 rotates with the spindle 15 and fuselage 12 relative to the stationary base 10.

A forward pitching bellows 17 and a rearward pitching bellows 18 are provided, the bottom portions of each of these bellows being affixed to the arms which hold the octagon 16 relative to the vertical spindle 15, and the upper ends of these bellows are affixed to the bottom of the fuselage 12. These two bellows lie in a vertical plane through the longitudinal center of the fuselage 12. Upon the admission of vacuum to the forward bellows 17 and atmosphere to the rear bellows 18, the former bellows collapses and the latter expands causing the fuselage 12 to assume a diving attitude. On the other hand the admission of vacuum to the rear bellows 18 and of atmosphere to the fore bellows 17 causes the fuselage 12 to assume a climbing attitude. As will be more fully explained later, the admission of vacuum and atmosphere into the bellows 17 and 18 may be controlled by the student in the trainer by moving the control wheel 30 fore and aft of the fuselage 12, so that the student may control the diving and climbing position of the fuselage 12. The diving and climbing position of the fuselage are sometimes referred to as "pitching."

At the same time trainers of this type have a left banking bellows 19 as well as a right banking bellows 20 upon the opposite side of the universal joint 14 from the bellows 19. The admission of vacuum and air into these bellows may be controlled by the student through a rotation of the control wheel 30 so that he may place the fuselage 12 in any desired banking position within the limits of the apparatus.

Trainers of the type being considered are often equipped with a stick instead of a control wheel, and it will be readily apparent to those skilled in the art, after reading this application, that they can substitute a stick for the wheel 30 and still obtain all of the advantages of my invention.

Fixedly carried by the octagon 16 are the horizontal arms 21 which support the turning motor 22. By means of a well known pulley arrangement connecting the turning motor 22 with the stationary base 10, the student in the fuselage 12 may, by pressing either of the rudder pedals 25b, energize the turning motor 22 in such a direction that the turning motor 22, supporting arms 21, octagon 16, bellows 17, 18, 19 and 20, spindle 15, universal joint 14 and fuselage 12 will rotate either to the left or right, as desired, relative to the stationary base 10. Thus the student may control the simulated heading of the fuselage 12 in the same manner that he would control the heading of a plane in actual flight. The arms 21a are attached to the octagon 16 and support the housing 21b in which may be placed a vacuum pump for operating the instruments in the trainer, as is well known in the prior art.

The steps 25 and door 26 allow access to the interior of the fuselage 12 and a slidable canopy 27 may be used to completely encompass the cockpit of the fuselage 12 in order to simulate blind flying conditions. The canopy 27 may be made of a suitable translucent material in order to permit enough light to enter the cockpit of the fuselage to enable the student to manipulate the trainer without the assistance of artificial lights placed in the interior of the fuselage. Such conditions closely simulate day-time blind flight conditions. On the other hand when it is desired to simulate night-time blind flying conditions, a suitable opaque material such as a cover may be placed over the canopy 27 in order that no light enters the cockpit through this canopy. The student must then rely upon the conventional artificial lights which are placed inside the cockpit. Such an arrangement closely simulates night-time blind flying conditions.

An instrument panel 29 is inside the fuselage and upon this panel are instruments which simulate the instruments carried by actual aircraft. As is well known to the prior art, these instruments operate in response to simulated conditions just as the corresponding instruments in a real plane react to real flight conditions.

*Simulated elevator control loading and trimming means*

Referring now to Fig. 2, it will be seen that the control wheel in the fuselage is designated 30 and that this wheel is fixedly mounted upon the rear end of the forwardly extending shaft 32. As will become clear later in the description, the fore end of the shaft 32 is mounted in a bracket carried by the fuselage so that the shaft 32 may move axially. A pair of collars 34 are affixed upon shaft 32 as shown so that axial movement of the shaft 32, caused by the student's pushing or pulling the wheel 30, results in a pivoting of the upstanding members 38 which are pivotally mounted at their lower ends upon the horizontal transverse shaft 40 which is fixedly held by the bracket 42 mounted upon the floor of the fuselage as seen in Fig. 1. The upstanding members 38 are positioned with respect to one another by the crosspieces 44 and 46.

In Fig. 2 it will be seen that integral with the fixed bracket 40 are a plurality of upstanding members 48 which support a base plate (not shown) to which are attached the fixed, vertical, bellows supporting plates 50, these two plates being parallel and placed upon opposite sides of the elevator control loading bellows designated generally by 52.

Reference is now made to Fig. 2A which is a detailed disclosure of the construction of the bellows 52. In Fig. 2A it will be seen that the bellows 52 comprises a pair of end members 54 which are fixedly held by the plates 50 by means of screws 55. In the center of the bellows 52 is the main, generally upstanding, common bellows-forming member 56 pivoted at its bottom end by means of the rod 57 held by the plates 50. It will be seen that between the member 56 and each of the end members 54 is a rigid wooden member 58 each having a plurality of holes 59 therethrough. Two substantially airproof, flexible coverings 60 are provided, one on either side of the member 56 and attached thereto. In view of the described arrangement it will be appreciated that the bellows 52 in reality comprises two separate bellows, each having one fixed end in the form of its associated member 54 and each having a common movable central member in the form of the member 56. The left bellows seen in Fig. 2A is designated 52a and is connected through the port 61 and air-vacuum line with the three leaf elevator centering valve designated generally by 63. The right bellows in Fig. 2A is designated 52b and is connected through port 64 and vacuum-air line 65 with the elevator centering valve 63.

Reference is now made to Fig. 2B which shows the detailed construction of the elevator centering valve 63. As seen, this valve comprises a lower fixed leaf 66, a center movable leaf 67 and an upper movable leaf 68. Referring to Fig. 2 it will be seen that the lower fixed leaf 66 is affixed to the bracket 69 which in turn is affixed to the plates 70 and 71 which are affixed to the stationary side plates 50. Consequently the lower leaf 66 is fixed in relation to the interior of the fuselage 12.

Referring to Fig. 2B, it will be seen that fixedly mounted in the center of the lower leaf 66 is the vertical hollow stem 72 having a plug 73 in its upper end a plurality of ports 74 in its side walls. Referring now to Fig. 2 it will be seen that the lower end of the hollow stem 72 is connected by means of the vacuum line 73 with the interior of the elevator control loading regulator bellows designated generally 74. The bellows 74 shown in detail in Fig. 2C comprises a lower fixed member 75 and an upper member 76 pivotally attached thereto. A suitable flexible, airtight covering 77 is provided. Attached to the upper pivoted member 76 is the plate 76a to which the lower end of the spring 127 is connected. Fixedly attached to the upper bellows member 76 is the needle 79 and a seat 80 is affixed to the lower member 75. Seat 80 is connected through the vacuum line 81 to the airspeed regulator bellows shown in Fig. 2 and designated generally 82. The airspeed regulator bellows is connected by vacuum line 83 to the well known turbine 84 shown in Fig. 1.

As is well known in the prior art, the airspeed regulator bellows 82, located as shown in Fig. 1, is responsive to the climbing and diving movements of the fuselage 12 as well as to the movements of the throttle lever conventionally found in trainers of the type being considered. For present purposes it is sufficient to know that the pressure within the airspeed regulator bellows 82 is at all times inversely related to the assumed airspeed of the fuselage. For convenience it may be stated that the higher the assumed airspeed, the greater is the vacuum within the bellows 82.

Still referring to Fig. 2, the vacuum within bellows 82 manifests itself at all times in the central stem 72 of the lower fixed leaf 66 through the vacuum line 81, elevator control loading regulator bellows 74 and vacuum line 73; but as will later appear the bellows 74 controls the amount of vacuum in stem 72.

Referring to Fig. 2B it will be seen that a pair of vertical ducts 85 and 86 extend from the upper face of leaf 66 downwardly and partly through the leaf 66. Connecting with the duct 85 is the exterior port 85a which connects with the line 65 which, as seen in Fig. 2, connects with the right bellows 52b of the bellows assembly 52. Similarly, connecting with the duct 86 is the port 87 which connects with the line 62 which connects with the interior of the bellows 52a of the bellows assembly 52.

Referring again to Fig. 2B, it will be seen that the movable center leaf 67 has a central bore 88 adapted to receive the vertical stem 72 and that two ports 89 and 90 extend completely through the leaf 67. When the leaf 67 is assembled relative to the lower fixed leaf 66, leaf 67 being in the central or neutral position, the port 89 coincides exactly with the port 85 and the port 90 coincides exactly with the port 86.

In the upper movable leaf 68 are a pair of vertical ducts 91 and 92 which extend completely through the leaf 68. It will be appreciated that the upper ends of both of the ducts 91 and 92 are at all times connected with the atmosphere. Centrally located within the leaf 68 is the vertical bore 93 extending completely through leaf 68 and adapted to receive the stem 72 of the lower leaf. Communicating with the vertical bore 93 of leaf 68 is the transverse duct 94 which communicates with the vertical duct 95 drilled in the lower face of the leaf 68.

When the three leaves of the valve shown in Fig. 2B are in the neutral assembled position, it will be appreciated that the vacuum in the stem 72 passes through the ports 74 in the stem into the ducts 94 and 95. In the neutral position, between the port 95 in leaf 68 and the ports 89 and 90 in leaf 67 there is no overlap, but the port 95 is tangent to the ports 89 and 90 so that a slight amount of vacuum leaks through the two latter ports. At the same time, in the central position, the atmosphere which is always present in the ports 91 and 92 cannot pass into either of the ports 89 or 90 because there is no overlap between the ports 91 and 89 on the one hand and ports 92 and 90 on the other. Consequently, when the leaves of the valve 63 are all in their neutral position, a slight amount of vacuum passes through the lines 62 and 65 into the bellows 52a and 52b, and the bellows are neutralized.

However, assuming that the upper leaf 68 is rotated counterclockwise from its neutral position, it will be appreciated that the vacuum port 95 will engage the port 89 which in the neutral position engages the port 85 of the lower leaf 66. At the same time the atmosphere port 92 will engage the port 90 which in the neutral position engages the port 86. Consequently, an increased amount of vacuum will be applied to the line 65 which connects with the interior of the bellows 52b and simultaneously atmosphere will be applied through the line 62 to the bellows 52a. The bellows 52b will therefore be contracted and the bellows 52a will expand. The common central member 56 will have a force applied thereto tending to move it to the right in Fig. 2 and by means of the clamping arrangement 57 and rod 44 the upper ends of the members 36 will tend to move toward the head of the fuselage. The shaft 32 and wheel 30 will have a force applied in the same direction.

On the other hand, it should be understood without a detailed explanation that when the three leaves of the valve 63 are in the neutral position, a clockwise movement of the upper leaf 68 will apply increased vacuum to the bellows 52a and atmosphere to the bellows 52b. The common central member 56 will have a force applied thereto tending to move it to the rear of the fuselage, and the shaft 32 and wheel 30 will have a tendency to move in the same direction.

Further, assuming that the leaves are in the neutral position and that the upper leaf 68 is moved counterclockwise to admit increased vacuum to the bellows 52b and atmosphere to the bellows 52a, it will be appreciated that a corresponding counterclockwise rotation of the center leaf 67 will shut off the passage of increased vacuum to the bellows 52b and will, at the same time, shut off the passage of air to the bellows 52a. The vacuum leak through the leaves when they are neutrally positioned will quickly neutralize the bellows 52a and 52b. On the other hand, with the leaves in their central position, should the upper leaf 68 be rotated clockwise to apply increased vacuum to the bellows 52a and air to the bellows 52b, a corresponding clockwise rotation of the center leaf 67 will shut off the passage of excess vacuum to the bellows 52a and air to the bellows 52b, and the two bellows will quickly become neutralized.

Referring again to Fig. 2, it will be seen that integral with the upper leaf 68 is the horizontal extension 96 which is pivotally connected by means of the stud 97 to the ball joint 98 affixed upon the forward end of the link 99. Affixed upon the link 99 is the stop 100 against which the forward end of the spring 101 compresses. Referring now to Fig. 2D, it will be seen that the rear end of spring 101 presses against the washer 102 encircling link 99. Integral with the link 99 is the enlarged portion 103 and encircling this enlarged portion is the sliding sleeve 104. A second washer 105 encircles link 99 and the fore end of a second spring 106 bears against washer 105. Stop 107 affixed upon link 99 positions the rear end of spring 106. Referring now to Fig. 2, it will be seen that the common bellows member 56 is attached to the sliding sleeve 104 so that the sleeve moves with member 56.

Assuming that the elevator centering valve is in the neutral position, in view of the preceding discussion it will be appreciated that the common bellows member 56 will also be in its neutral position. Consequently the bellows 52a and 52b will be neutralized. Now assuming that the student in the trainer desires to place the fuselage in a diving position, he will push the wheel 30 toward the head of the fuselage. The vertical members 38 will pivot about the rod 40, the upper ends of these members moving in the same direction as the wheel, and the upper end of the common bellows member 56 will also move toward the head of the fuselage. Sleeve 104 moves in the same direction compressing spring 101 and the compression of this spring acting upon the stop 100 moves the link 99 in the same direction. The upper valve leaf 68 will be rotated clockwise as seen from above and according to the previously explained operation of this valve, excess vacuum will be admitted to the bellows 52a and atmosphere will be simultaneously admitted to the bellows 52b. This admission of excess vacuum and air to these two bellows occurs as soon as the wheel 30 is pushed ahead of its neutral position. It will be appreciated that the admission of vacuum into the bellows 52a will tend to collapse the bellows 52a and the air admitted to bellows 52b will tend to expand the bellows 52b. Consequently a force resisting the forward movement of the wheel 30 will be immediately present. This closely simulates the loading placed upon the wheel of a plane in actual flight when the wheel is moved ahead of its neutral position.

When the wheel 30 is in its neutral fore and aft position, the valve 63 is in its neutral position. Should the wheel 30 then be moved by the student to the rear of the neutral position, the upper leaf 68 is rotated in the counterclockwise direction. Simultaneously, excess vacuum is applied to the forward bellows 52b and atmosphere to the rear bellows 52a. Thus a force is immediately present to resist the movement of the wheel 30 rearward from its neutral position, just as in the case of a plane in actual flight.

Assuming that with the wheel 30 and valve 63 in their neutral positions, the student pulls back on the wheel 30, excess vacuum is admitted to the forward bellows 52b and atmosphere to the rear bellows 52a. If then the student merely releases the wheel 30, the vacuum in the bellows 52b and atmosphere in the bellows 52a will move the common center member 56 toward the head of the trainer. The moving of the member 56 in this direction moves the wheel 30 ahead to its neutral position and simultaneously rotates the leaf 68 back to its neutral position. When the leaf 68 reaches its neutral position, the bellows 52a and 52b become quickly neutralized, and the wheel 30, member 56 and leaf 68 remain in their neutral positions. On the other hand should the student push the wheel 30 ahead of its neutral position, excess vacuum is admitted to bellows 52a and air to bellows 52b. If then the student releases the wheel 30, the bellows 52a and 52b move the member 56 and wheel 30 to the rear. The movement of member 56 simultaneously rotates leaf 68 to its neutral position, and when it reaches this position, the bellows 52a and 52b quickly become neutralized, and the wheel 30, member 56 and leaf 68 will be retained in their respective neutral positions.

In view of the foregoing disclosure the conclusion may be drawn that this invention discloses novel means whereby the control wheel 30 may have a force applied thereto tending to resist movement of the wheel in either direction from its neutral position. Also, when the wheel is moved from its neutral position and released, the wheel will return to its neutral position. Those skilled in the art of flying will appreciate that the bellows 52a and 52b act upon the control wheel 30 in the same manner that the slip stream of a plane in actual flight acts upon the wheel in the plane through its effect upon the elevator of the plane, to which the control wheel is connected.

It will be appreciated by those skilled in the art of flying and in the field of aviation trainers that as soon as the student moves the wheel 30 to the rear of its neutral position, the fuselage 12 should assume a climbing position and that when the student moves the wheel 30 ahead of its neutral position, the fuselage should assume a diving attitude. This response is obtained simultaneously with the loading of the wheel as described above by means of a part of the apparatus shown in Fig. 2. In that figure it will be seen that the link 110 is pivotally attached to the right vertical member 38 and the rear end of link or arm 110 is pivotally attached to the upper end of the lever 111. Lever 111 is pivotally connected to the rotor of the shock absorber 112 which is fixedly mounted upon the upstanding members 48 integral with the bracket 42. To the lower end of the lever 111 is pivotally connected the forward end of the link 113, the rear end of which is pivotally connected to the arm 114 which is affixed to the upper leaf of the elevator valve designated 115. The construction and operation of the elevator valve 115 is well known to the prior art, it being deemed sufficient for the purpose of this application to state that the central stem 115a of this valve is connected to the manifold designated generally 114a which is positioned as seen in Fig. 1. The manifold is connected through vacuum line 114b with the turbine 84 so as to be supplied at all times with a constant level of vacuum, as is well known in the prior art. The ports 115b and 115c of valve 115 are each connected to one of the pitching bellows 17 or 18. Upon a rearward movement of the control wheel 30 the upper leaf of the elevator valve 115 is moved clockwise and vacuum is admitted to the rear elevator bellows 18 and simultaneously therewith atmosphere is admitted to the forward elevator bellows 17. On the other hand when the wheel 30 is pushed ahead of its neutral position by means of the just described mechanism, vacuum is admitted to the forward pitching bellows 17 and atmosphere to the rearward pitching bellows 18 thus resulting in a diving of the fuselage 12. The position of the elevator valve 115 depends at all times upon the fore and aft position of the wheel 30, and therefore the climbing and diving position of the fuselage 12 depends upon the fore and aft position of the wheel, just as the climbing and diving position of a plane in actual flight depends upon the fore and aft position of the wheel.

Thus the conclusion may be drawn that as soon as the student in the fuselage moves the control wheel 30 ahead or to the rear of its neutral position, the fuselage assumes the proper diving or climbing attitude, and that a force is present to resist the movement of the control wheel from its neutral position, both of which responses occur in the case of a plane in actual flight. Now assuming that the student in the fuselage has moved the wheel 30 from its neutral position, vacuum will be admitted to one of the bellows 52a or 52b and atmosphere to the other and the upper leaf of the elevator valve will be properly turned so that the fuselage will assume the correct pitching (climbing or diving) attitude. Then if the student merely releases the wheel 30, the bellows 52a and 52b will return the wheel 30 to its neutral position and at the same time the upper leaf of the elevator valve will also be returned to its neutral position. Simultaneously the upper leaf 68 of the elevator centering valve 63 will be returned to its neutral position. Consequently the fuselage will assume the level flight position, the wheel will be returned to its neutral position and the loading upon the wheel will disappear. This closely simulates the three responses which occur when the pilot of a plane in actual flight, having moved the wheel from its neutral position, merely releases the wheel. The shock absorber 112 dampens the return of the control column to its neutral position under the influence of bellows 52.

Those skilled in the art of flying will appreciate that the load which is placed upon the control wheel as it is moved fore and aft of its neutral position increases the farther the wheel is moved from the neutral position. Furthermore, this load increases with an increase in the air speed of the plane. This application also discloses means for simulating these two factors which affect the load upon the wheel of a plane in actual flight as the wheel is moved from its neutral position.

Referring again to Fig. 2, it will be seen that the rear end of the link 116 is pivotally connected to the right upstanding member 38 and the forward end of this link is pivotally connected to the lower end of the lever 117 which is pivotally mounted upon the stud 117a held by bracket 71. To the upper end of lever 117 is pivotally connected the link 118, the fore end of which is pivotally attached to the upper end of the arm 119 which, as best seen in Fig. 2E, has its lower end pivotally attached to the plate 70 by means of stud 120. A stud 121 is integral with the arm 119 and a slide 122 has two slots 123 therein. The studs 120 and 121 pass through the slots 123 in member 122. Another stud 124 is fixedly carried by the upper end of the slide 122 and carried by this stud is the cam roller 125. A cam 126 is pivotally carried by the stud 120 and a spring 127 has its upper end attached to the lower end of slide 122, the lower end of spring 127 being attached to the extension 77a affixed upon the upper movable portion 76 of the bellows 74.

When the wheel 30 and the centering valve 63 are both in the neutral position, the cam roller 124 is centered with respect to the cam 126 and therefore a minimum of tension is exerted upon the spring 127. Consequently the vacuum present within the bellows 74 is at a minimum, e. g., one inch. As soon as the wheel 30 is moved from its neutral position, not only is the upper leaf 68 of the centering valve 63 rotated so as to cause the bellows 52a and 52b to exert a force upon the wheel 30 resisting the movement of the wheel from its neutral position, but simultaneously therewith the link 116 will be moved and through the operation of the lever 117 and link 118 the upper end of arm 119 will simultaneously be moved. The movement of the arm 119 will, by means of stud 121, cause a rotation of the slide 122 about an axis through the stud 120. Inasmuch as the cam 126 remains stationary, roller 125 will move out of the central neutral position with respect to cam 126, i. e., roller 125 will move to the left or right and simultaneously the cam 126 will force this roller upward, increasing the tension upon spring 127. The increased tension upon the spring 127 will result in a greater vacuum within the bellows 74, and consequently more vacuum will be applied to the centering valve 63. Thus more vacuum will be applied to the bellows 52a or 52b as the wheel 30 is moved farther from its neutral position. The application of increased vacuum to the bellows 52a or 52b will, of course, result in an increase in the force resisting the movement of the control wheel 30 away from its neutral position. Consequently the greater the distance the control wheel 30 is moved from its neutral position, the greater will become the force opposing further movement of the control wheel.

For future reference, it should be noted that the cam roller 125 moves in a direction opposite the direction of movement of the wheel 30.

As far as the factor of the assumed air speed of the fuselage affecting the force resisting the movement of the control wheel 30 is concerned, as stated above and as is well known to the prior art, the greater the assumed air speed of the fuselage the greater is the vacuum within the air speed regulator bellows 82. The greater the vacuum within the bellows 82, the greater will be the vacuum within the bellows 74 and consequently the greater will be the vacuum applied to the bellows 52a or 52b upon a movement of the control wheel 30 from its neutral position. Consequently the force resisting a movement of the control wheel 30 from its neutral position is dependent upon the vacuum within bellows 82 which in turn is dependent upon the assumed air speed of the fuselage.

The elevator trimming means which may form a part of my invention will now be described. Referring to Fig. 2, it will be seen that the manually rotatable elevator trimming member 130 is provided, this member being affixed within the fuselage for rotation about the horizontal axis 131. By means of a right angle drive 132 the screw 133 may be rotated in response to a rotation of the control 130. Rotation of the screw 133 results in an axial movement of the nut 134 and a corresponding movement of the link 135, the rear end of which is attached to the nut 134 as shown. Movement of the link 135 results in a movement of the arms of bell crank 136 as well as in a movement of the link 137, the rear end of which is pivotally connected to the integral extension 67a of the center leaf 67 of the elevator centering valve 63.

Assuming that the student in the trainer finds that he must exert a constant fore or aft pressure upon the control wheel 30 in order to keep the fuselage in the desired climbing or diving position, it will be appreciated that simultaneously with the holding of the control wheel in the necessary position he will have displaced the upper leaf 68 of the elevator centering valve 63 a given distance from its neutral position. Instead of manually holding the control wheel 30 in the necessary off-center position to maintain the desired attitude of the fuselage, the student may hold the wheel 30 as required and simultaneously rotate the elevator trimming control 130 in the correct direction until the center leaf 67 of valve 63 again assumes a neutral position with respect to the upper leaf 68. In order to accomplish this result it will be appreciated that the center leaf 67 must be rotated in the same direction and through the same angle that the leaf 68 was rotated by the manual holding of the control wheel 30 from its neutral position. When the center leaf 67 has been rotated through this angle, it will be appreciated that it will prevent the application of excess vacuum and atmosphere to the bellows 52a and 52b. The excess vacuum in the bellows 52a or 52b is quickly dissipated as soon as this neutral position is reached and the pressure upon the control wheel 30 is relieved. The control wheel remains in the same position in which it was held in by the student while he was rotating the trim control 130, and consequently the fuselage 12 remains in the same climbing, diving or level flight position. Specifically, it may be stated that if the student finds that he must exert a constant back pressure upon the wheel 30 to maintain the fuselage in the desired pitching position, wheel 130 is rotated counterclockwise, nut 134 travels ahead, and the center leaf 67a is rotated counterclockwise until the trimmed position is reached. If the student must exert a constant forward pressure, wheel 130 is rotated clockwise to the correct trimmed position.

Accordingly with the apparatus disclosed in Fig. 2 the student in the trainer may trim the fuselage so that he does not have to exert a constant pressure upon the control wheel 30 in order to keep the fuselage in the desired pitching attitude. It will be appreciated that this trimming of the trainer may be used by the student to climb or dive the trainer at a given angle or to fly the trainer at a constant altitude.

It will be appreciated by those skilled in the art of flying that the trimming of one of the control surfaces to relieve the pressure upon the control associated with that surface establishes a new position for the control at which no pressure is present upon the control. As the control is then moved from this new position, a load is immediately placed upon the control, and the farther the control is moved from the trim-established zero pressure point, the greater becomes the pressure. If the control is released, the control surface and the control connected thereto return to the trim-established zero pressure point and not to the absolute neutral positions. The following means incorporated herein simulate this functioning of the control surfaces and controls of actual aircraft, as far as the elevator and fore and aft position of the wheel are concerned.

Referring to Fig. 2 it will be appreciated that as the nut 134 moves axially of the screw 133, the link 140 moves therewith. The bell crank 141 is turned and the transverse link 142 is moved resulting in a movement of the bell crank 143 and rearwardly extending link 144. The rear end of link 144 is pivotally attached to the lower end of the cam 126 through the universal connector 144a, and, consequently, the cam 126 moves whenever the elevator trimming control 130 is rotated. The movement of cam 126 will change the vertical position of roller 125 and consequently the tension upon spring 127.

Let us assume that the student must place the wheel 30 in a position to the rear of its neutral position in order to maintain the fuselage in the desired climbing attitude. In moving the wheel 30 from its neutral position it has been explained that the upper leaf of the valve 63 is rotated so as to admit vacuum to the bellows 52b and atmosphere to the bellows 52a. The elevator valve 115 is operated to place the trainer in the desired climbing attitude and the movement to the rear of the wheel 30 simultaneously results in a movement toward the head of the trainer of the cam roller 125. The roller 125 is raised and the tension upon spring 127 is increased—the farther the backward movement of wheel 30 the greater the relative motion between the roller 125 and the cam 126. Then, when the student rotates the elevator trim control 130 counterclockwise in order to move the leaf 67 of valve 63 to relieve the pressure upon the wheel 30, the link 144 simultaneously moves toward the rear of the trainer and the cam 126 rotates clockwise about the pivot 120. This rotation of the cam 126 allows spring 127 to pull the slide 122 and roller 125 downwardly, and when the leaf 67 is positioned by the student in the neutral position with respect to the leaf 68, the roller 125 is in the lowermost position with respect to cam 126. Thus the trimming of the trainer relaxes the tension which is placed upon the spring 127 when the wheel 30 is moved away from its neutral position so that when the elevator is properly trimmed, a normal or neutral tension is placed upon spring 127. As previously explained, the wheel 30 will remain displaced from its absolute neutral position and in the position in which the student had to hold the wheel to maintain the fuselage in the desired climbing position. Consequently, thereafter, should the student desire to move the wheel 30 farther to the rear, the pressure which he must exert upon the wheel is decreased by the amount that he removed when he had previously trimmed the trainer. Thus the trimming of the elevator by the student establishes a new neutral pressure point just as is the case in actual flight.

It will be appreciated that if the student finds he must hold the wheel forward to maintain the fuselage in the desired diving position, when he trims the fuselage he will establish a new zero pressure point.

In the flight of actual aircraft equipped with elevator trimming means, the climbing and diving position of the plane may be controlled by a manipulation of the elevator trimming control. Thus, when it is desired to lower the nose of the plane the trim tab control may be rotated in the proper direction resulting in a movement of the elevator so that the nose drops. As the elevator moves, the control wheel moves to the fore. On the other hand, when it is desired to raise the nose of the plane, the trim control may be rotated in the opposite direction, the elevator moves in the opposite direction, and the nose of the plane rises. The wheel moves to the rear with the movement of the elevator. The previously disclosed simulated elevator trimming means of this invention may also be used to simulate this sometimes used method of controlling the climbing or diving attitude of a plane in actual flight.

Referring to Fig. 2, assuming that the wheel 30 and leaves of valve 63 are centered, if the student rotates the control 130 clockwise, the center leaf 67 of valve 63 is rotated clockwise admitting vacuum to the bellows 52b and air to the bellows 52a. The central bellows member 56 moves ahead, carrying with it the wheel 30, and the elevator valve 115 is operated to place the fuselage in a diving position. The forward movement of the member 56 simultaneously causes a clockwise rotation of the leaf 68 of valve 63. Bellows 52b will be collapsed, moving member 56 ahead and rotating leaf 68 clockwise until this leaf is again neutrally positioned with respect to the leaf 67. When this position is reached the member 56 is stopped, the pressures within bellows 52a and 52 become neutralized, and the wheel 30 is held ahead of its neutral position at a point depending upon angular movement of the simulated elevator trim control 130. The nose of the fuselage will be lowered as a result of the rotation of the upper leaf of the elevator valve 115.

An opposite rotation of the simulated elevator trim control 130 will produce reversed movements of the same parts of the apparatus just considered.

In view of the detailed disclosure of the preferred embodiment of my simulated elevator trimming means for use in grounded aviation trainers, it will be understood that I have provided apparatus which accomplishes the following results:

1. In the neutral position there is no load upon the control wheel, but as the wheel is moved ahead or to the rear of the neutral position, a load is immediately placed upon the wheel to resist the movement of the wheel and this load increases the farther the wheel is moved from its neutral position. The fuselage, simultaneously with a movement of the wheel from its neutral position, assumes the proper climbing or diving attitude.

2. When the wheel is moved from its neutral position the load placed upon the wheel is dependent upon the assumed air speed of the trainer—the higher the assumed air speed the greater the load.

3. The student may use the provided simulated elevator trimming means to relieve the pressure from the control wheel when he finds that he must exert a constant pressure upon the wheel in order to keep the trainer in the desired climbing or diving attitude. In using the simulated elevator trimming means the student holds the wheel in the correct position in order to maintain the correct climbing or diving attitude of the fuselage and then operates the simulated elevator trimming means until the pressure has been removed from the wheel, just as he would do in actual flight. When this point is reached the simulated elevator trimming means are properly positioned and the wheel is not moved as a result of the movement of the trimming means. The operation of the simulated elevator trimming means establishes a new neutral point insofar as pressure upon the wheel is concerned.

4. Alternatively, the simulated elevator trimming control may be used by the student to change the pitching attitude of the fuselage, just as the elevator trimming control in a real plane may be used to change the pitching attitude of the plane. When this method of operation is used the fore and aft position of the wheel as well as the position of the upper leaf of the elevator valve changes with the rotation of the simulated trimming control.

*Simulated aileron loading and trimming means*

Reference is now made to Fig. 3 which discloses in detail the preferred embodiment of the simulated aileron loading and trimming means which may form a part of my invention. In Fig. 3 the wheel 30 and main shaft 32 upon which the wheel is affixed are shown. A bracket 160 is fixedly attached to the interior of the fuselage 12 some distance above the floor thereof and the bracket 161 is fixedly attached to the bracket 160. A plurality of upstanding members 162 integral with bracket 161 support the aileron control loading bellows assembly designated generally by 163. This bellows assembly, for all practical purposes, is identical with the elevator control loading bellows assembly shown in Fig. 2. A pair of side plates 164 are provided, these plates holding in a fixed position the end members 165 of the two bellows of the assembly. A common central member 166 is provided to form two independent bellows, the left bellows being designated 163a and the right bellows being designated 163b. The vacuum-air line 167 connects bellows 163a with the aileron centering valve designated generally by 168 while the vacuum-air line 169 connects the bellows 163b with the valve 168. The aileron centering valve 168 is of identical construction as the elevator centering valve 63 shown in detail in Fig. 2B.

Still referring to Fig. 3, it will be seen that there is affixed on the shaft 32 a gear 170 meshing with the sector 171. The arm 172 is integral with sector 171 and the lower end of link 173 is pivotally connected to the outer end of arm 172. The upper end of link 173 is pivotally connected to the rear arm of bellcrank 174, this bellcrank being pivotally mounted on the transverse shaft 175 held by the brackets 176 which in turn are held by the rigid side plates 164. To the upper end of bellcrank 174 is pivotally attached the rear end of link 177, the fore end of which is pivotally connected to the top of the common bellows forming member 166. Link 178 is provided, this link having its fore end attached to the common bellows member 166 through a compensating spring arrangement designated generally by 179, this spring arrangement being identical with that disclosed in Fig. 2D. The rear end of the link 178 is connected to the upper rotatable leaf 180 of the valve 168.

The central stem of the aileron centering valve 168 is connected through the vacuum line 181 to the aileron control loading regulator bellows designated generally by 182. This bellows is constructed the same as the bellows shown in Fig. 2C and is connected through the vacuum line 183 to the airspeed regulator bellows designated generally by 82. As shown in Fig. 2, bellows 82 is connected to the turbine 84.

In view of the marked similarity of the construction shown in Fig. 3 to that previously described in connection with Fig. 2, it should be understood that when the wheel 30 is in its neutral rotational position (to be distinguished from the neutral fore and aft position), the upper rotatable leaf 180 of the aileron centering valve 168 is in its neutral position. When the middle leaf 184 of this valve is also centered, the bellows 163a and 163b have equal pressure therein and consequently there is no load upon the wheel 30. However, assuming that the student in the trainer turns the wheel counterclockwise as he would do to bank the fuselage to the left, through the gear 170, gear sector 171 and arm 172, link 173, bellcrank 174 and link 177, the upper end of the common bellows member 166 would be pushed ahead, member 166 pivoting about the axis 185. This movement of member 166 results in a movement to the head of the fuselage of link 178 and the upper leaf 180 of the aileron centering valve 168 is rotated counterclockwise. Immediately, increased vacuum is applied to the interior of the bellows 163b and air to the interior of the bellows 163a. Consequently, a force is instantly present upon movement of the wheel 30 from its neutral position tending to resist such movement of the wheel.

On the other hand, should the wheel 30 be moved clockwise of its neutral position it will be appreciated that the direction of rotation of the leaf 180 will be reversed and increased vacuum will be applied to the interior of the bellows 163a while atmosphere will be applied to the interior of the bellows 163b. Similarly, as soon as the wheel is moved clockwise of its neutral position the bellows 163a and 163b operate to exert a force resisting the movement of the wheel 30.

If the wheel 30 is rotated from its neutral position it will be appreciated that if the student merely releases the wheel the bellows 163a and 163b will return it to its neutral position. A shock absorber 171a having affixed upon its rotor the arm 171b is provided, arm 171b being actuated by stud 171c affixed to the lower extension 171d of sector 171. This shock absorber dampens the return of wheel 30 to its neutral position under the influence of the bellows 163.

As soon as the wheel 30 is moved from its central or neutral position, the fuselage should, of course, bank to the left or right, the direction of bank depending upon the direction of rotation of the wheel 30 from its neutral position. This response is also accomplished by the apparatus shown in Fig. 3. Affixed to the sector 171 for rotation therewith is the rearwardly extending shaft 188 upon the rear end of which is affixed the arm 189. The upper end of link 190 is pivotally connected to the outer end of arm 189, and as seen in the upper right portion of Fig. 3, to the lower end of the vertical link 190 is pivotally attached the left end of arm 191. The other end of arm 191 is affixed to the fore end of shaft 192 which runs rearwardly to the arm 193, the lower end of which is affixed upon shaft 192. To the upper end of arm 193 is pivotally connected the left end of link 194, the right end of which is pivotally connected to the upper leaf 195 of the aileron valve designated generally by 196. The position of the aileron valve 196 in the trainer fuselage is shown in Fig. 1.

The aileron valve 196 is of the conventional well-known construction, for our purposes it being sufficient to know that the central stem of this valve is connected to the manifold 114a which is connected to the turbine 84 through the vacuum line 114b, seen in Fig. 1. Valve 196 is connected to the left and right banking bellows 19 and 20 shown in Fig. 1, by means of lines 196b and 196c. Upon a counterclockwise rotation of the upper leaf 195 in one direction, vacuum is admitted to the left banking bellows and atmosphere to the right banking bellows, the left bellows collapsing and the right bellows expanding to cause a banking of the fuselage to the left. A rotation of the leaf 195 in the opposite direction admits vacuum to the right banking bellows and air to the left banking bellows and the trainer banks to the right.

Assuming that the control wheel 30 is in the neutral position and that the leaves of the main aileron valve 196 are similarly positioned, when the student in the trainer rotates the wheel 30 counterclockwise of its neutral position, the bellows 163a and 163b not only instantly exert a force tending to resist the rotation of the control wheel but simultaneously therewith the upper leaf 195 of the aileron valve 196 is rotated counterclockwise and the trainer banks to the left. On the other hand, should the wheel 30 be rotated clockwise of its neutral position, the bellows 163a and 163b similarly exert a force tending to resist the movement of the control wheel and simultaneously therewith the upper leaf 195 of the aileron valve 196 is rotated clockwise and the trainer banks to the right.

As is well known to the prior art, the degree of bank of the fuselage will depend upon the extent of the movement of the wheel 30 from its neutral position.

It will therefore be appreciated that this invention also discloses means whereby upon a movement of the control wheel from its neutral position, a force will be exerted which will tend to oppose the movement of the control wheel, thereby simulating the resistance to the movement of the control wheel in a plane in actual flight as a result of the slipstream acting upon the ailerons. At the same time as the wheel is moved from its central position, the fuselage 12 is properly banked.

As explained above in connection with the simulated elevator system of this invention, in the case of actual aircraft as the wheel is moved fore and aft to operate the elevators of the plane the resistance to movement of the wheel caused by the slipstream increases the farther the control wheel is moved from the neutral position. The same is true in actual aircraft as far as movement of the ailerons and aileron control is concerned. The following means may form a part of this invention to simulate this phenomenon of actual flight.

Referring to Fig. 3, it will be seen that the fore end of the link 200 is pivotally connected to the central bellows member 166 and the rear end of this link is pivotally connected to the lower end of lever 201 which is pivotally mounted on the stud 202 carried by the plate 164. The fore end of link 203 is pivotally connected to the upper end of lever 201 and the rear end of this link is pivotally attached to the upper end of arm 204 which is mounted for rotation upon the stud 205 held by the plate 206 which in turn is held by the plates 176 and 207 affixed to the main sideplate 164. Referring to Fig. 3A, the stud 207a is carried by arm 204 and passes through a slot 208 in the slide 209. A second slot 210 is in the slide 209, stud 205 passing through the slot 210. Affixed to the lower end of slide 209 is the spring 211, the lower end of which is affixed to the upper movable portion 212 of the aileron control loading regulator bellows 182. This bellows is also carried by the plate 206. The cam 213 is pivotally mounted upon the stud 205 and the upper end of slide 209 carries a stud 214 upon the outer end of which is rotatably mounted the roller 215, roller 215 engaging the surface of cam 213.

It will be appreciated that an arrangement similar to the one just described has been disclosed in connection with the simulated elevator system.

Assuming that the control wheel 30 and the leaves of the aileron centering valve 168 are in their respective neutral rotational positions, the roller 215 is in its lowermost position with respect to cam 213. Then assuming that the student moves the control wheel 30 counterclockwise of its neutral position, the fuselage banks through the operation of the aileron valve 196 and simultaneously therewith the link 177 moves the central bellows member 166 ahead. Link 178 moves ahead and the upper leaf 180 of the aileron centering valve 168 is rotated counterclockwise as seen from above, admitting increased vacuum to the bellows 163b and atmosphere to the bellows 163a, thus producing a force opposing the movement of the wheel 30. Simultaneous with the movement of the bellows member 166, the link 200 moves ahead and the link 203 moves to the rear. The arm 209 rotates clockwise about the stud 205 and by means of the stud 207a, the slide 209 is rotated in the same direction about the stud 205. Inasmuch as cam 213 remains stationary, roller 215 is moved upward by its coaction with cam 213 and the tension upon spring 211 is increased. Consequently, the vacuum within the regulator bellows 182 increases and a greater amount of vacuum is applied through the centering valve 168 to the bellows 163b. The farther the control wheel 30 is moved from its neutral position the greater becomes the vacuum within bellows 163b and consequently the greater becomes the force opposing further movement of the wheel 30. Consequently, as the wheel 30 is moved a greater distance counterclockwise of its neutral position, the greater becomes the vacuum within bellows 163b and the greater is the force opposing the movement of the wheel. This simulates the increasing force tending to resist the counterclockwise rotation of the wheel in actual flight as the wheel is moved farther from its neutral position.

On the other hand, should the wheel 30 be moved clockwise of its neutral position, it will be appreciated that the fuselage assumes a right banking position, increased vacuum is admitted to the bellows 163a and air to the bellows 163b. The movement of the central bellows member 166 simultaneous with a rotation of the wheel 30 results in a counterclockwise rotation of the arm 204 about the axis of stud 205. A similar rotation of the slide 209 will occur and the roller 215 will be forced upward by the cam 213. The tension upon spring 211 will increase as will the vacuum within the regulator bellows 212. Consequently, the vacuum within bellows 163a will increase the farther the wheel 30 is moved from its neutral position and thus with increased rotation of the wheel 30 a proportionately greater force is exerted tending to resist the movement of the wheel.

Referring again to the procedures of actual flight for purposes of comparison, if the pilot in the plane finds that he must constantly hold the wheel in a given rotational position in order to keep the plane in the desired banking position he may, if his plane be so equipped, trim the ailerons to relieve the pressure upon the wheel. When this has been done the plane will fly in the desired banking position.

This phase of actual flight may be simulated by the following means which are disclosed by this application. Referring to Fig. 3, the aileron trimming control which is manually operated is designated by 220 and is affixed upon the rear end of the horizontal shaft 221, upon the fore end of which is affixed the gear 222. Gear 222 meshes with the gear 223 which is affixed upon the lower end of the flexible shaft 224 inside the conventional flexible shaft sheathing 224a. Referring to the upper center portion of Fig. 3, the continuation of flexible shaft 224 is shown and this flexible shaft drives the screw 225 rotatably mounted in the bracket 226 which is carried by the plate 206. A nut 227 is mounted upon the screw 225, this nut carrying the stud 228 which engages the left end of the rod 229. The other end of rod 229 is connected to the integral extension 184a of the middle leaf 184 of the aileron centering valve 168.

In view of the just described arrangement, if the student finds that the wheel 30 must be held in a given counterclockwise rotational position in order to place the trainer in the proper banking position, it will be appreciated that in so holding the wheel he will have moved the upper leaf 180 of the centering valve 168 to a given position counterclockwise of its neutral position. This position of the upper leaf 180 will have admitted increased vacuum to the bellows 163b and air to the bellows 163a so that a force must be constantly exerted upon the wheel 30 to hold it in the necessary position. The student may then by a counterclockwise rotation of the simulated aileron trim control 220 and the described intermediate connections move the nut 227 to the right along screw 225. In so moving the nut 227 the center leaf 184 of the centering valve 168 is rotated counterclockwise. When the leaf 184 has been rotated counterclockwise of its neutral position through the same angle as the leaf 180 was rotated by the clockwise rotation of wheel 30, the leaves 180 and 184 are neutrally positioned with respect to one another and the same amount of vacuum leaks through the valve 168 into the bellows 163a and 163b. The pressure within the bellows 163a and 163b is rapidly equalized and the central bellows member 166 remains in the position in which it was placed by the original counterclockwise rotation of the control wheel 30. Accordingly, the force exerted by the bellows 163a and 163b upon the central member 166 disappears and the force tending to rotate the wheel 30 clockwise simultaneously disappears. The wheel 30 remains in the position in which it was held by the student before he regulated the simulated aileron trim control 220 and the banking position of the fuselage remains unchanged.

It will be understood without a detailed explanation that should the student find that he must hold the wheel 30 in a given position clockwise from its neutral position in order to maintain the fuselage in the desired position about its longitudinal axis, a clockwise rotation of the simulated aileron trim control 220 through the correct angle will properly position the center leaf 184 of the centering valve 168 relative to the top leaf 180 so that the force exerted by the bellows 163a and 163b tending to rotate the wheel 30 counterclockwise will disappear, leaving the wheel 30 in the position in which it was being held by the student. Accordingly the pressure is removed from the wheel and the fuselage maintains the banking position in which it was placed by the student holding the control wheel before he manipulated the simulated aileron trim control 220.

Accordingly it will be appreciated that this invention discloses means whereby when the student finds that he must hold the control wheel 30 in a given rotational position in order to maintain the fuselage in the correct banking position, he may, by means of the simulated aileron trim control, relieve the pressure from the wheel just as he would do in actual flight.

It was explained in connection with the simulated elevator trimming means of this application that in actual flight the trimming of the elevators of the plane establishes a new zero point insofar as pressure upon the wheel caused by the slipstream is concerned. The same is true when the ailerons of a real plane in actual flight are trimmed and the following means may form a part of this invention in order to simulate this effect of the trimming of the ailerons of a plane in actual flight. Referring to Fig. 3 it will be seen that the stud 230 is affixed to the nut 227 for movement therewith and that the lower end of this stud engages the right end of the link 231, the left end of which is pivotally attached to the rear end of the upper arm 232 of the bell crank designated generally 233. Bell crank 233 is held by the bracket 234 affixed to the stationary plate 206. The lower member of the bell crank 233 is designated 235 and to this lower arm is pivotally attached the rear end of link 236, the fore end of which is pivotally connected to the lower end of cam 213.

It has been explained that when the student rotates the wheel 30 from its neutral position, the farther the wheel is rotated the increasing rotation of the slide 209 results in an upward movement of the roller 215 because of the presence of cam 213. Consequently the greater the distance wheel 30 is rotated from its neutral position, the greater becomes the tension upon spring 211 and the resultant increase in vacuum within the regulator bellows 182 results in a greater force acting upon the central bellows member 166. Assuming that the student finds that he must hold the wheel 30 in a given counterclockwise position from its neutral point, it has been explained that the central bellows member 166 will be moved ahead of its neutral position. Link 200 similarly will be moved ahead of its neutral position and link 203 will be moved to the rear. The arm 204 will be rotated clockwise from its neutral position and the roller 215 will be moved to the rear of the center of cam 213. Then, assuming that the student desires to use the simulated aileron trimming control 220 to remove the pressure upon the wheel 30, he will rotate the control knob 220 counterclockwise and the nut 227 moves to the right, link 231 will move in the same direction and by means of the bell crank 233, link 236 will move ahead of its neutral position. Consequently the cam 213 will be rotated clockwise and when the center leaf 184 of the centering valve 168 is neutralized with respect to the upper leaf 180, the cam 213 will be positioned such that the roller 215 is in the center of this cam. Consequently roller 215 will be in its lowermost position and the tension upon spring 211 will be relaxed to a minimum. Consequently, if the student thereafter desires to manually move the control wheel 30 from the trimmed position, the load which will be instantly placed upon the wheel will not be dependent upon the position of the wheel with respect to the absolute zero position, but will be dependent upon the position of the wheel from the new neutral position established by the trimming of the simulated aileron control. This simulates the establishing of the new zero pressure point when the ailerons of a plane in actual flight are trimmed. It will be appreciated that a new zero pressure point is also established when the simulated aileron trim control 220 is rotated counterclockwise to obviate the necessity of the student's holding the wheel in a given clockwise position from its neutral point in order to maintain the fuselage in the desired banking position.

Without a detailed explanation it should be understood that with the wheel 30 and simulated aileron trim control 220 positioned so that no pressure is upon the wheel, a clockwise rotation of the simulated aileron trim control 220 will result in a clockwise rotation of the wheel 30 and a banking of the fuselage to the left. On the other hand, a counterclockwise rotation of the control 220 will, under the same circumstances, result in a counterclockwise rotation of the wheel 30 and a banking of the fuselage to the right. These rotations of the wheel 30 in response to a rotation of the control 220 occur because the valve 168, responsive to the control 220, operates the bellows 163a and 163b which then moves the wheel 30 through the intermediate connecting members.

Insofar as the simulated aileron control trimming means disclosed by this invention is concerned, it will be appreciated that the similarity in structure produces the same novel results as explained in detail toward the end of the discussion of the simulated elevator trimming means.

*Simulated rudder loading and trimming means*

Figure 4:
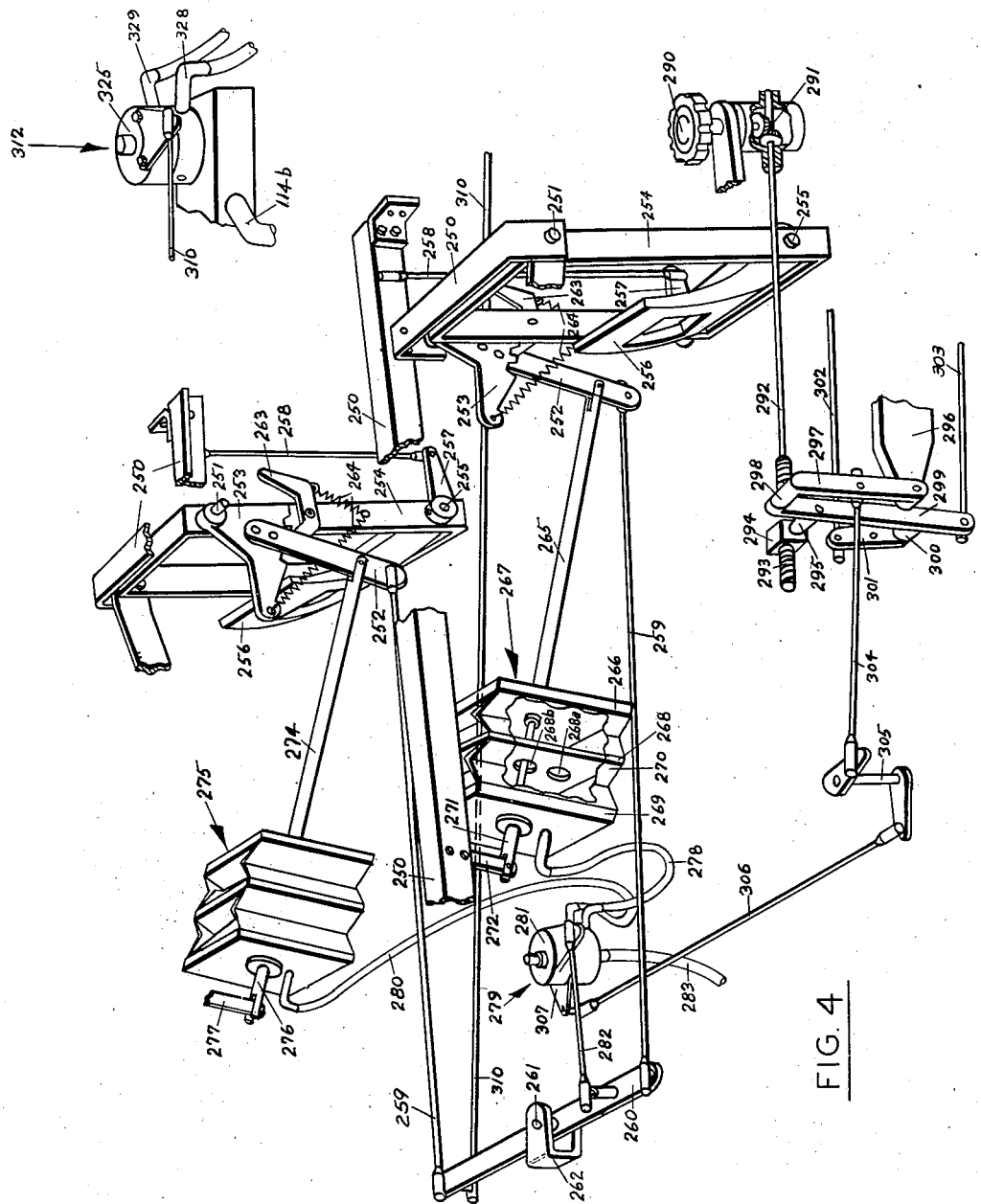
Fig. 4 is a detailed showing of the rudder pedal loading and trim system.

Reference is now made to Fig. 4 which discloses in detail the simulated rudder loading and trimming means of this application. In Fig. 4 it will be seen that there is provided a pair of brackets 250, these brackets being affixed to the inside of the fuselage a substantial distance above the floor at a point ahead of the student's seat, as seen in Fig. 1. A pair of rods 251 are held by the brackets 250, and pivotally carried by each of the rods is a ratchet member 253. Also pivotally carried by each of the rods 251 is a depending U-shaped bracket 254 having rotatably mounted in the lower portion thereof a transverse shaft 255 upon each of which is fixedly mounted one of the rudder pedals 256. Fixedly attached to the inner end of each of the shafts 255 is an arm 257 to the rear end of each of which is pivotally attached a generally upstanding link 258, the upper end of each of which is pivotally attached to its associated bracket 250. An arm 252 is affixed to each of the ratchets 253, as shown, and pivotally attached to the bottom end of each of the arms 252 is a forwardly extending link 259, the forward end of each of which is pivotally connected to one end of the rudder bar 260 which is pivotally mounted upon the stud 261 carried by the bracket 262 which is fixed to the bottom of the fuselage floor. A dog 263 is pivotally carried by each of the U-shaped brackets 254, and it will be appreciated that by selectively positioning the engaging end of each dog with respect to the teeth in the adjoining ratchet 253, the rudder pedals 256 may be positioned according to the individual requirements of the student using the trainer. The springs 264 assure the constant engagement of the dogs and ratchets.

Affixed to the left depending arm 252 is the rear end of the forwardly extending rod 265 which is affixed to the rear portion 266 of the left rudder control loading bellows designated generally by 267. It will be seen that this bellows comprises a central member 268 and a forward member 269 as well as the suitable covering material 270. A plurality of holes 268a and 268b are drilled through member 268, as shown.

The rod 271 has an enlarged forward end and is fixed to the forward end 269 of bellows 267. The forward end of this rod is pivotally attached to the lower end of the arm 272 carried by the fixed bracket 250. It should be noted that the rear end of the rod 271 passes through hole 268b in the central member 268 of the bellows 267 and telescopes inside the rod 265.

A rod 274, bellows designated generally 275, rod 276 and arm 277 are provided, these parts being constructed exactly like the corresponding members just described. The left rudder control loading bellows 267 is connected by means of the air-vacuum line 278 to the rudder centering valve designated generally by 279 and the right rudder control loading bellows 275 is connected by means of the air-vacuum line 280 to centering valve 279. Valve 279 is of identical construction with the elevator centering valve designated generally by 63 in Fig. 2 and shown in detail in Fig. 2B. In Fig. 4 it will be noted that the upper rotatable leaf 281 of valve 279 has attached thereto the rear end of the link 282, the forward end of which is pivotally connected to the rudder bar 260. It will be noted that the central portion of the valve 279 is connected by means of the vacuum line 283 directly to the turbine 84.

Assuming that the rudder pedals 256 are in their neutral positions and that the leaves of the valve 279 are similarly positioned, should the student desire to turn the fuselage to the left he will of course press forward upon the left rudder pedal. The left link 259 moves ahead, the rudder bar 260 rotates clockwise as seen from above, and simultaneously therewith the right link 259 moves to the rear, thus pushing the right rudder pedal 256 toward the rear of the fuselage. Simultaneously, with the rotation of the rudder bar 260, the link 282 moves ahead and the upper leaf 281 of the valve 279 is moved clockwise. Immediately air is introduced into the bellows 267 through the line 278 and increased vacuum is introduced into the bellows 275 through the line 280. The expansion of the bellows 266 and the contraction of the bellows 275 immediately exert a force tending to oppose the foward movement of the left rudder pedal 256. This opposing force resisting the movement of the rudder pedal 256 simulates the effect upon the slipstream of the rudder of an actual plane when the pilot presses the left rudder pedal forward.

On the other hand, with the rudder pedals 256 in their neutral position should the student push the right rudder pedal 256 forward, it will be appreciated that the rudder bar 260 will rotate counterclockwise, the link 282 will move to the rear and the upper leaf 281 of valve 279 will be rotated counterclockwise. Instantly, air will be admitted to the interior of bellows 275 and increased vacuum to the interior of bellows 267. Both of the bellows will, therefore, resist the forward movement of the right rudder pedal 256, again simulating the load upon the rudder pedals of a plane in actual flight caused by the slipstream.

A capillary is placed in both of the lines 278 and 280 to prevent a sudden over-application of vacuum to the bellows 267 and 275.

It will be appreciated that whenever the rudder pedals 256 are displaced from their neutral positions, the fuselage 12 should rotate with respect to the stationary base 10—to the left when the left rudder pedal is forward and to the right when the right rudder pedal is forward. In Fig. 4 it will be seen that the fore end of link 310 is pivotally connected to the rudder bar 260 and that the rear end of this link is similarly connected to the upper rotatable leaf 325 of the main rudder valve 312. This rudder valve is of the well-known conventional construction, having its central stem connected to manfold 114a which in turn is connected through vacuum line 114b to the turbine 84, and its ports 328 and 329 to the turning motor 22. When the left rudder pedal 256 is pressed forward the right rudder pedal simultaneously moves to the rear by an equal amount, as does link 310, the upper leaf 325 moves counterclockwise as seen from above, and the turning motor 22 is energized in such a direction that the fuselage 12 rotates to the left. Opposite rudder pedal movements result in opposite movements, the fuselage rotating to the right.

Also, in the case of actual aircraft when one of the rudder pedals is moved forward, the other moves to the rear, and if the pilot removes his foot from the forward pedal the slipstream pressure upon the rudder centers the rudder, and inasmuch as the rudder pedals are connected to the rudder they also are centered. The apparatus disclosed in Fig. 4 simulates this response of the rudder pedals in actual flight. In the left rudder pedal 256 is forced ahead of its neutral position, air is admitted to the bellows 267 and excess vacuum to the bellows 275. These two bellows thus exert a force upon both of the rudder pedals tending to return them to their neutral positions. Consequently, if the student removes his foot from the left rudder pedal, the bellows will return the rudder pedals toward their neutral positions and when they reach their neutral positions the upper leaf 281 of valve 279 will be centered, equalizing the pressure within the bellows and thus preventing further movement of the rudder pedals.

Without a detailed explanation it will be understood that should the right rudder pedal be moved forward and the left rudder pedal moved to the rear, when the student releases his foot from the right pedal the bellows will return the pedals and upper leaf 281 to their neutral positions, at which points the rudder pedals remain.

In both cases it will be noted that when the rudder pedals are displaced from their neutral positions the upper leaf 325 of the rudder valve 312 will be displaced from its neutral position in the proper direction so that the trainer turns to the left or right. When the rudder pedals are returned to their neutral positions by the bellows, the upper leaf 325 is simultaneously returned to its neutral position and the turning of the fuselage stops.

Under most flying conditions, most planes will not fly perfectly straight with the rudder in the dead center position. If the plane is not equipped with rudder trimming means it is necessary for the pilot to hold the rudder pedals in the correct position in order to keep the plane flying a straight course. Different pressures will have to be applied under different circumstances. For example, on the take-off it may be necessary to apply a great deal of right rudder in order to keep the plane flying straight down the runway. In cruising, left rudder may be necessary. In order to render it unnecessary for the pilot to apply a given amount of rudder over a long period of time, in order to keep the plane flying the desired course, aircraft of the type being simulated generally are equipped with rudder trimming means whereby the plane may be trimmed in order to keep it flying the desired course without the pilots constantly applying a corrective pressure to the rudder pedals.

Simulated rudder trimming means are also provided by this invention and for a disclosure thereof reference is made to Fig. 4 where the simulated manual rudder trimming control is designated by 290. Upon a manual rotation of knob 290, the right angle drive 291 causes a rotation of the shaft 292 upon the forward end of which is affixed the screw 293. A nut 294 coacts with screw 293 to travel longitudinally thereof upon a rotation of the screw, and stud 295 travels with the nut 294. A bracket 296 is affixed to the interior of the fuselage 12 and the lower end of arm 297 is pivotally mounted upon this bracket. A horizontal extension 298 is integral with arm 297 and pivotally connected to extension 298 is the upper end of the walking beam 299. Walking beam 299 is pivotally mounted on stud 295 as shown. Integral with the lower end of walking beam 299 is the horizontal extension 300, and pivotally mounted upon the right end of this extension is the lower end of arm 301. A pair of links 302 and 303 are pivotally attached to arm 301 and beam 299 as shown. For present purposes, it is sufficient to know that link 302 is connected to means within the fuselage responsive to changes in the airspeed of the fuselage. Consequently the link 302 always assumes a position dependent upon the assumed airspeed. Link 303 is connected to the simulated throttle lever in the trainer so that it changes in response to a movement of the throttle lever. Insofar as understanding the operation of the simulated rudder trim control of this invention is concerned, the links 302 and 303 may be considered stationary thus providing a fixed pivot for the lower end of the walking beam 299.

Affixed to the arm 297 is the rear end of link 304, the forward end of which is affixed to the upper arm of bellcrank 305. The left end of link 306 is pivotally attached to the lower arm of bellcrank 305 and the right end of this link is pivotally attached to the center leaf 307 of the rudder centering valve 279.

Whenever the student in the fuselage finds that he must apply a constant pressure to one of the rudder pedals in order to maintain the fuselage upon the desired heading, it seems clear that the upper leaf 281 of the valve 279 will be displaced from its neutral position and consequently that the bellows 267 and 275 will exert a constant force tending to return the rudder pedals to their neutral positions. The rudder valve 312 will be positioned so that the fuselage maintains the desired heading.

Instead of so positioning the rudder pedals by means of his feet, the student may by rotating the simulated rudder trim control 290 move the nut 294 in the desired direction. Movement of this nut results in a pivoting of the walking beam 299 about its lower end and the arm 297 is pivoted about its lower end. Link 304 moves in the correct direction, as does link 306, the center leaf 307 of the valve 279 rotates in the correct direction until it is centered with respect to the upper leaf 281. When this point is reached the pressures within the bellows 267 and 275 become quickly neutralized, relieving the pressure upon the rudder pedals, but neither of the bellows is returned to its neutral position. Consequently, the positions of the rudder pedals 256 are not changed and neither is the relative positions of the leaves of the rudder valve 312. Accordingly, the trainer maintains the desired heading.

Specifically, let us assume that the student in order to maintain the fuselage upon the correct heading finds that he must exert a constant pressure upon the left rudder pedal 256. The upper leaf 281 of the control valve 279 will be rotated clockwise a given distance from its neutral position while the upper leaf of the rudder valve 312 will be rotated a given distance counterclockwise from its neutral position. Atmosphere will be admitted to the bellows 267 and vacuum to the bellows 275. The student will then rotate the simulated rudder trim control 290 counterclockwise as seen from above and the nut 294 moves toward the head of the fuselage. The middle leaf 307 of the valve 279 will be rotated clockwise and when this leaf is centered with respect to the upper leaf 281 the pressure within the two bellows 267 and 275 will become quickly neutralized. The position of the rudder pedals 256 and of the upper leaf of the rudder valve 312 will be undisturbed with the releasing of the pressure caused by the bellows upon the rudder pedals.

It should be noted that the load placed upon the simulated rudder pedals, when the pedals are moved from their neutral positions, is independent of the assumed airspeed of the trainer and of the extent which the pedals are moved from their neutral positions. However, such means may be provided, in view of the above disclosure relating to the aileron and elevator systems, if such means are desired.

It will be appreciated that numerous changes may be made in the preferred embodiment of my invention without departing from the spirit thereof. All such changes are intended to be covered by the following claims. Furthermore, my invention is not necessarily restricted to use in grounded trainers of the type illustrated.

I claim:

1. In a grounded flying training device of the type including a simulated fuselage having a seat for a student, the combination of a member simulating a flight control member of an actual aircraft positioned near said seat; a pneumatically operated member connected to said flight control simulating member; a control valve connected to said pneumatically operated member for controlling the operation of the same; and a connection between said flight control simulating member and said control valve for operating said control valve upon movement of said flight control simulating member in either direction from a predetermined neutral position for causing said pneumatically operated member to exert through its connection with said flight control simulating member a force upon said flight control simulating member opposite the direction of movement of said flight control simulating member.

2. In a grounded flying training device of the type including a fuselage having a seat for a student, the combination of a member simulating the banking control member of an actual aircraft positioned near said seat; a pneumatically operated member connected to said banking control simulating member; a control valve connected to said pneumatically operated member for controlling the operation of the same; and a connection between said banking control simulating member and said control valve for operating said control valve upon movement of said banking control simulating member in either direction from the predetermined neutral position for causing said pneumatically operated member to exert through its connection with said banking control simulating member a force upon said banking control simulating member opposite the direction of movement of said flight control simulating member.

3. In a grounded flying training device of the type including a fuselage having a seat for a student, the combination of a member simulating the pitching control member of an actual aircraft positioned near said seat; a pneumatically operated member connected to said pitching control simulating member; a control valve connected to said pneumatically operated member for controlling the operation of the same; and a connection between said pitching control simulating member and said control valve for operating said control valve upon movement of said pitching control simulating member in either direction from the predetermined neutral position for causing said pneumatically operated member to exert through its connection with said pitching control simulating member a force upon said pitching control simulating member opposite the direction of movement of said flight control simulating member.

4. In a grounded flying training device of the type including a fuselage having a seat for a student, the combination of a pair of simulated rudder pedals positioned near said seat; pneumatically operated means connected to said simulated rudder pedals; a control valve connected to said pneumatically operated means for controlling the operation of the same; and a connection between said simulated rudder pedals and said control valve for operating said control valve upon movement of said simulated rudder pedals from a predetermined neutral position for causing said pneumatically operated means to exert through its connection with said simulated rudder pedals a force upon the simulated rudder pedals opposite the direction of movement thereof.

5. In a grounded flying training device of the type including a simulated fuselage having a seat for a student, the combination of a member simulating a flight control member of actual aircraft positioned near said seat; a pair of bellows connected to said flight control simulating member; control valve means connected to each of said pair of bellows and a pneumatic source connected to said control valve means; and means operated by a movement of said flight control simulating member in one direction from a predetermined neutral position for operating said valve means to connect said pneumatic source with one of said bellows and for operating said valve means to connect said pneumatic source with the other of said bellows upon a movement of said flight control simulating member in the opposite direction from said predetermined neutral position.

6. In a grounded flying training device of the type including a simulated fuselage having a seat for a student, the combination of a member simulating a flight control member of actual aircraft; a bellows connected to said flight control simulating member; a control valve connected to said bellows and a pneumatic source arranged to be connected to said bellows through said valve according to the position of said valve; and connecting means between said flight control simulating member and said valve operated by a movement of said flight control simulating member in one direction from a predetermined neutral position for operating said valve to connect said pneumatic source with said bellows and for operating said valve to vent said bellows to the atmosphere upon a movement of said flight control simulating member in the opposite direction from said predetermined neutral position.

7. In a grounded flying training device of the type including a simulated fuselage having a seat for a student, the combination of a manually movable member simulating a flight control of an actual aircraft positioned near said seat; a fluid-operated member connected to said flight control simulating member; a valve connected to said fluid-operated member so that when said valve is in a predetermined neutral position said fluid-operated member is neutralized; a fluid source connected to said valve; and a connection between said flight control simulating member and said valve so that when a manual force is applied to said flight control simulating member to move the same from a predetermined neutral position said valve is positioned to operate said fluid-operated member to exert a force upon said flight control simulating member in the direction opposite the manual movement thereof, and when said manual force is removed said fluid-operated member returns said flight control simulating member and said valve to said predetermined neutral position.

8. In a grounded flying training device of the type including a simulated fuselage having a seat for a student, the combination of a member simulating a flight control of an actual aircraft positioned near said seat; a pair of bellows connected to said flight control simulating member; a reversible control valve connected to said bellows for controlling the operation of the same; a source of vacuum connected to said control valve; and a connection between said flight control simulating member and said control valve for operating said control valve upon movement of said flight control simulating member in one direction from a predetermined neutral position to admit vacuum to one of said pair of bellows and for operating said control valve upon movement of said flight control simulating member in the opposite direction from said predetermined neutral position to admit vacuum to the other of said bellows.

9. In a grounded flying training device of the type including a simulated fuselage having a seat for a student, the combination of a member simulating a flight control of an actual aircraft positioned near said seat; a pair of bellows connected to said flight control simulating member; a source of vacuum connected to a control valve, said control valve also having a connection to each of said pair of bellows and a port communicating with the atmosphere; and a connection between said flight control simulating member and said control valve for operating said control valve upon movement of said flight control simulating member in one direction from a predetermined neutral position to admit vacuum to the first of said pair of bellows and atmosphere to the second and for operating said control valve upon movement of said flight control simulating member in the opposite direction from said predetermined neutral position to admit vacuum to the second of said pair of bellows and atmosphere to the first of said pair of bellows.

10. In a grounded flying training device the combination of a simulated fuselage rotatably mounted with respect to a stationary base and having a seat for a student; a pair of simulated rudder pedals positioned near said seat; pneumatically operated means connected to said simulated rudder pedals; a first control valve connected to said pneumatically operated means for controlling the operation of the same; a second control valve in said fuselage for controlling the rotation thereof with respect to said stationary base; and a connection between said rudder pedals and each of said control valves so that said first mentioned control valve is positioned to operate said pneumatically operated means and said second control valve is positioned to control the rotation of said fuselage according to the positions of said simulated rudder pedals.

11. In a grounded flying training device the combination of a simulated fuselage mounted upon a universal joint for banking and having a seat for a student; a member in said fuselage near said seat simulating the banking control in an actual aircraft; pneumatically operated means connected to said simulated banking control; a first control valve connected to said pneumatically operated means for controlling the operation of the same; a second control valve in said fuselage for controlling the banking thereof; and a connection between said simulated banking control and each of said control valves so that said first mentioned control valve is positioned to operate said pneumatically operated means and said second control valve is positioned to control the banking position of said fuselage according to the position of said simulated banking control.

12. In a grounded flying training device the combination of a simulated fuselage mounted upon a universal joint for pitching and having a seat for a student; a member in said fuselage near said seat simulating the pitching control in an actual aircraft; pneumatically operated means connected to said simulated pitching control; a first control valve connected to said pneumatically operated means for controlling the operation of the same; a second control valve in said fuselage for controlling the pitching thereof; and a connection between said simulated pitching control and each of said control valves so that said first mentioned control valve is positioned to operate said pneumatically operated means and said second control valve is positioned to control the pitching position of said fuselage according to the position of said simulated pitching control.

13. In a grounded aviation training device the combination of a simulated fuselage having a seat from a student; a manually operable member simulating a flight control member of an actual aircraft positioned near said seat; a pneumatically operated member connected to said flight control simulating member; a control valve connected to said pneumatically operated member for controlling the operation of the same; a connection between said flight control simulating member and said control valve for operating said control valve upon movement of said flight control simulating member in either direction from a predetermined neutral position for causing said pneumatically operated member to exert through its connection with said flight control simulating member a force upon said flight control simulating member in the direction opposite the direction of movement of said flight control simulating member; and a manually operable member simulating a control surface trimming control of an actual aircraft connected to said control valve for operating the same to relieve the force exerted upon said flight control simulating member by said pneumatically operated member when said flight control simulating member is held in a position removed from said predetermined neutral position.

14. In a grounded aviation training device the combination of a fuselage having a seat for a student; a manually operable member simulating the banking control member of an actual aircraft positioned near said seat; a pneumatically operated member connected to said banking control simulating member; a control valve connected to said pneumatically operated member for controlling the operation of the same; a connection between said banking control simulating member and said control valve for operating said control valve upon movement of said banking control simulating member in either direction from a predetermined neutral position for causing said pneumatically operated member to exert through its connection with said banking control simulating member a force upon said banking control simulating member in the direction opposite the direction of movement of said flight control simulating member; and manually operable means simulating the aileron trimming means of actual aircraft connected to said control valve for operating the same to relieve the force exerted upon said banking control simulating member by said pneumatically operated member when said banking control simulating member is held in a position removed from said predetermined neutral position.

15. In a grounded aviation training device the combination of a fuselage having a seat for a student; a manually operable member simulating the pitching control member of an actual aircraft positioned near said seat; a pneumatically operated member connected to said pitching control simulating member; a control valve connected to said pneumatically operated member for controlling the operation of the same; a connection between said pitching control simulating member and said control valve for operating said control valve upon movement of said pitching control simulating member in either direction from a predetermined neutral position for causing said pneumatically operated member to exert through its connection with said pitching control simulating member a force upon said pitching control simulating member in the direction opposite the direction of movement of said flight control simulating member; and a manually operable member simulating the elevator trimming means of actual aircraft connected to said control valve for operating the same to relieve the force exerted upon said pitching control simulating member by said pneumatically operated member when said pitching control simulating member is held in a position removed from said predetermined neutral position.

16. In a grounded aviation training device the combination of a fuselage having a seat for a student; a pair of rudder pedals simulating the rudder pedals of a real plane positioned near said seat; pneumatically operated means connected to said simulated rudder pedals; a control valve connected to said pneumatically operated means for controlling the operation of the same; a connection between said simulated rudder pedals and said control valve for operating said control valve upon movement of said rudder pedals from predetermined neutral positions for causing said pneumatically operated means to exert through its connection with said rudder pedals a force upon the rudder pedals in the direction opposite the direction of movement thereof; and a manually operable member simulating the rudder trimming means of actual aircraft connected to said control valve for operating the same to relieve the force exerted upon the rudder pedals when they are held in positions removed from the predetermined neutral position.

17. In a grounded aviation training device the combination of a fuselage having a seat for a student; a manually operable member simulating a flight control member of actual aircraft positioned near said seat; a pair of bellows connected to said flight control simulating member; control valve means connected to each of said pair of bellows and a pneumatic source connected to said control valve means; means operated by a movement of said flight control simulating member in one direction from a predetermined neutral position for operating said valve means to connect said pneumatic source with one of said bellows and for operating said valve means to connect said pneumatic source with the other of said bellows upon a movement of said flight control simulating member in the opposite direction from said predetermined neutral position; and a manually operable member simulating a control surface trimming member of an actual aircraft connected to said control valve means for operating the same.

18. In a grounded aviation training device the combination of a manually operable member simulating a flight control member of actual aircraft; a bellows connected to said flight control simulating member; a control valve connected to said bellows and a pneumatic source arranged to be connected to said bellows through said valve according to the position of said valve; means operated by a movement of said flight control simulating member in one direction from a predetermined neutral position for operating said valve to connect said pneumatic source with said bellows and for operating said valve to vent said bellows to the atmosphere upon a movement of said flight control simulating member in the opposite direction from said predetermined neutral position and a manually operable member simulating a control surface trimming means of actual aircraft connected to said valve for operating the same.

19. In a grounded aviation training device including a fuselage having a seat for a student, the combination of a member simulating a flight control member of an actual aircraft positioned near said seat; a pair of bellows connected to said flight control simulating member; a control valve connected to said bellows for controlling the operation of the same a source of vacuum connected to said control valve; a connection between said flight control simulating member and said control valve for operating said control valve upon movement of said flight control simulating member in one direction from a predetermined neutral position to admit vacuum to one of said pair of bellows and for operating said control valve upon movement of said flight control simulating member in the opposite direction from said predetermined neutral position to admit vacuum to the other bellows; and a manually operable member simulating a control surface trimming control of an actual aircraft connected to said control valve for regulating the passage of vacuum through said valve to said bellows.

20. In a grounded aviation training device including a simulated fuselage having a seat for a student, a member simulating a flight control of an actual aircraft positioned near said seat; a pair of bellows connected to said flight control simulating member; a source of vacuum connected to a control valve, said control valve also having a connection to each of said bellows and a port communicating with the atmosphere; a connection between said flight control simulating member and said control valve for operating said valve upon movement of said flight control simulating member in one direction from a predetermined neutral position to admit vacuum to the first of said pair of bellows and atmosphere to the second and for operating said control valve upon movement of said flight control simulating member in the opposite direction from said predetermined neutral position to admit vacuum to the second of said pair of bellows and atmosphere to the first; and a manually operable member simulating a control surface trimming control of an actual aircraft connected to said control valve for regulating the passage of vacuum and air to said bellows.

21. In a grounded aviation training device including a fuselage having a seat for a student, the combination of a member simulating a flight control member of an actual aircraft positioned near said seat; a pair of bellows connected to said flight control simulating member; a control valve connected to a pneumatic source, said control valve having two relatively movable leaves; a pneumatic connection between said valve and each of said bellows; a manually operable member inside said fuselage; and mechanical connections from said flight control simulating member and said manually operable member to said valve for differentially positioning the relatively movable leaves of said valve.

KARL A. KAIL.

REFERENCES CITED

The following references are of record in the file of this patent:

UNITED STATES PATENTS

| Number | Name | Date |
| --- | --- | --- |
| 2,316,181 | Ocker | Apr. 13, 1943 |
| 2,341,253 | West | Feb. 8, 1944 |
| 2,358,016 | Link | Sept. 12, 1944 |
| 2,358,018 | Lowkrantz | Sept. 12, 1944 |
| 2,385,095 | McCarthy | Sept. 18, 1945 |
| 2,396,660 | Kanter | Mar. 19, 1946 |
| 2,450,261 | West | Sept. 28, 1948 |